United States Patent [19]

Shah et al.

[11] 4,242,476

[45] Dec. 30, 1980

[54] POLYMER/POLYOL COMPOSITIONS CONTAINING VINYLIDENE CHLORIDE

[75] Inventors: Naresh R. Shah, Nitro; Edgar G. Shook, South Charleston; Russell Van Cleve, Charleston, all of W. Va.

[73] Assignee: Union Carbide Corporation, New York, N.Y.

[21] Appl. No.: 961,715

[22] Filed: Nov. 17, 1978

[51] Int. Cl.$^3$ .............................................. C08F 2/06
[52] U.S. Cl. ..................................... 526/71; 526/209
[58] Field of Search ................................. 526/71, 209

[56] References Cited

U.S. PATENT DOCUMENTS

| | | | |
|---|---|---|---|
| Re. 28,715 | 2/1976 | Stamberger | 521/137 |
| Re. 29,118 | 1/1977 | Stamberger | 521/137 |
| 3,655,553 | 4/1972 | DeWald | 260/858 |
| 3,875,258 | 4/1975 | Patton et al. | 260/869 |
| 3,931,092 | 1/1976 | Ramlow et al. | 260/30.4 R |
| 3,953,393 | 4/1976 | Ramlow et al. | 260/31.8 R |
| 4,014,846 | 3/1977 | Ramlow et al. | 260/30.6 R |
| 4,100,339 | 7/1978 | König et al. | 526/209 |
| 4,122,056 | 10/1978 | Ramlow et al. | 526/209 |
| 4,125,505 | 11/1978 | Critchfield et al. | 526/209 |

FOREIGN PATENT DOCUMENTS

| | | |
|---|---|---|
| 828524 | 4/1975 | Belgium . |
| 828525 | 4/1975 | Belgium . |
| 735010 | 5/1966 | Canada . |
| 2500240 | 10/1975 | Fed. Rep. of Germany . |
| 1412797 | 11/1975 | United Kingdom . |

*Primary Examiner*—Maurice J. Welsh
*Attorney, Agent, or Firm*—Richard J. Gallagher

[57] ABSTRACT

This invention relates to novel liquid polymer/polyol compositions consisting essentially of (1) a major amount of a polyol and (2) a minor amount of an acrylonitrile-vinylidene chloride polymer consisting essentially of (a) from 45 to 5 weight percent of polymerized vinylidene chloride and (b) from 55 to 95 weight percent of another polymerized monomer of monomers of which at least 20 weight percent is polymerized acrylonitrile, said weight percents being based on the weight of the polymer, and said polymer being in the form of particles that are stably dispersed in the polyol. The polymer/polyol compositions are prepared by a free radical catalyst initiated continuous process carried out at a temperature of 100° C. or higher. The novel polymer/polyols are convertible to novel polyurethane products such as high resilience polyurethane foams having improved flammability characteristics.

10 Claims, No Drawings

POLYMER/POLYOL COMPOSITIONS CONTAINING VINYLIDENE CHLORIDE

CROSS-REFERENCE TO RELATED APPLICATION

The subject matter of this application is related to that of Seefried et al. U.S. Patent Application Ser. No. 961,717, filed on even date, entitled: IMPROVEMENTS IN LOAD-BEARING AND FLAMMABILITY PROPERTIES OF FLEXIBLE URETHANE FOAMS.

BACKGROUND OF THE INVENTION

1. Field of the Invention

This invention relates to novel polymer/polyol compositions which can react with polyisocyanates to form polyurethane products. The invention also relates to a novel method for making such compositions, and to novel polyurethane products, including tolylene diisocyanate based high resilience ("HR") foams made from such polymer/polyol compositions.

2. Description of the Prior Art

Polymer/polyol compositions suitable for use in producing polyurethane foams, elastomers, and the like, are known materials. The basic patents in this field are U.S. Pat. No. 3,304,273, 3,383,351, Re. 28,715 and Re. 29,118 to Stamberger. Such compositions can be produced by polymerizing one or more olefinically unsaturated monomers dissolved or dispersed in a polyol in the presence of a free radical catalyst. Polymer/polyol compositions have the valuable property of imparting to, for example, polyurethane foams and elastomers produced therefrom, higher load-bearing properties than are provided by unmodified polyols.

Polymer/polyols containing vinylidene chloride have been disclosed previously. For example, Dewald (U.S. Pat. No. 3,655,553) describes the preparation of polymer/polyols containing vinylidene chloride (but no acrylonitrile) in a polyol or a polyol blend. He employed a low reaction temperature (65° C.) and a semi-batch process. Another example is the Patton et al. (U.S. Pat. No. 3,875,258) disclosure of polymer/polyols containing copolymers of bis($\beta$-chloroethyl) vinyl phosphonate and vinylidene chloride and also polymer/polyols containing copolymers of bis($\beta$-chloroethyl) vinyl phosphonate, styrene, and vinylidene chloride. They employ a high reaction temperature (125°-130° C.) and a semi-batch process. Both Dewald and Patton et al. teach that such polymer/polyols can be utilized in the preparation of polyurethanes having flame retardant properties.

A Ramlow et al. patent (U.S. Pat. No. 3,953,393) teaches the preparation of polymer/polyols containing vinylidene chloride only or copolymers of vinylidene chloride and vinyl acetate or ethyl acrylate or methyl methacrylate in polyols containing added unsaturation. It operates at a temperature below 100° C., in the presence of a free-radical catalyst and a chain transfer agent (such as dodecylmercaptan). It employs a batch process having a typical holding time of 4 to 6 hours. According to its teachings, high reaction temperatures (i.e. greater than 100° C.) do considerable damage to sensitive monomers such as acrylonitrile and vinylidene chloride as well as to the polyols, resulting in colored dispersions. Kuryla (Canadian Pat. No. 735,010) provides a generic teaching of the preparation of polyurethane foams from isocyanates and polymer/polyol compositions. The generic teachings of Kuryla relate to polyols having hydroxyl numbers of at least about 40. Among the monomers listed by Kuryla are acrylonitrile and vinylidene chloride. Examples 17 and 18 of Kuryla describe polymer/polyol compositions made with mixtures of acrylonitrile and vinylidene chloride (which are used to make polyurethane foams in Examples 64 and 65). However, Kuryla employs 50 percent or more vinylidene chloride in the monomer mixture, which results in a high degree of dehydrochlorination. Kuryla prepares the polymer/polyol compositions in a semi-batch process employing peroxide catalysts at low reaction temperatures (60°-87° C.) with a reaction period of 8-9 hours, which likewise significantly increases the degree of dehydrochlorination. Neither Ramlow et al. nor Kuryla contains a teaching that fire retardant polyurethanes products can be made from the polymer/polyol compositions which they disclose.

Current commercial molded high resilience (HR) foams are based, in many cases, upon an isocyanate blend (of tolylene diisocyanates and a polymeric isocyanate) and a polymer/polyol composition derived from acrylonitrile and styrene. A continuous process for the production of acrylonitrile:styrene-polymer/polyol is described in Priest (British Patent Specification No. 1,412,797—Example 7). As far as is known, none of the above-mentioned vinylidene chloride-polymer/polyols have been used commercially in producing molded HR foams. As discussed in the copending Seefried et al. U.S. Pat. application cross-referenced supra, there are substantial industry incentives to base molded HR foams on a single isocyanate. In producing molded HR foams from tolylene diisocyanate alone, small concentrations of additive flame retardants are required to enable the foams to meet Federal Motor Vehicle Safety Standard (FMVSS) No. 302 specifications. Generally, flame retardant additives are not stable in resin premixes and must be metered in a separate stream to the foam machine mixing head. Elimination of the special equipment and handling procedures for the additive flame retardant would significantly simplify the foam production operation.

Seefried et al. disclose molded, high resilience, flexible urethane foams produced from tolylene diisocyanate and a polymer/polyol in which the polymer is made from a minor amount of acrylonitrile and a major amount of vinylidene chloride. The Application teaches that such foams have desirable load-bearing characteristics and exhibit fire retardant properties which obviate the necessity for fire retardant additives. The polymer/polyol compositions used to prepare the Seefried et al. foams are prepared by a method generally similar to that of Kuryla, although the polyols utilized in the Seefried et al. Application are ethylene oxide-capped and have very low hydroxyl numbers. Accordingly, the Seefried et al. foams are, unlike those of Kuryla, high resilience foams.

OBJECTS

An object of this invention is the production of high resilience polyurethane foams which, although they are based upon only a single isocyanate (the 80:20 isomer ratio of 2,4-toluenediisocyanate:2,6-toluenediisocyanate-"TDI"), pass stringent flammability tests without any added flame retardant.

Another object of this invention is to make polymer/polyol compositions containing minor concentrations of vinylidene chloride at reaction temperatures of greater than 100° C. via a continuous process in the absence of chain transfer agents.

Still another object of this invention is to reduce the problem of dehydrochlorination in a polymer/polyol derived from vinylidene chloride by using a minor amount of an epoxidized oil.

Finally, it is an object of this invention to utilize the polymer/polyol to make polyurethane products for such end uses as arm rests, crash pads, mattresses, and automobile bumpers.

SUMMARY OF THE INVENTION

The present invention provides novel polymer/polyol compositions and methods for their preparation, as well as polyurethane products made therefrom. The polymer/polyol compositions comprise a major amount of an organic polyol medium having stably dispersed therein a minor amount of an interpolymer consisting essentially of (a) from 5 to 45 percent of polymerized vinylidene chloride and (b) from 95 to 55 percent of another polymerized monomer or monomers, of which at least 20 percent (based on the weight of the interpolymer) is polymerized acrylonitrile. Said polymer/polyol compositions are prepared by the continuous free radical catalyst-initiated polymerization, at a temperature of 100° C. or higher and optionally in the presence of an epoxy plasticizer which reduces dehydrochlorination, of a stream of the appropriate monomers in a polyol stream. The polymer/polyol compositions of this invention can be used like conventional polymer/polyol compositions in the production of polyurethane products. For example, novel high resilience foams can be made from the polymer/polyol compositions of this invention and tolylene diisocyanate. Such HR foams pass stringent flammability tests even when no flame retardant additives are incorporated therein.

DESCRIPTION OF THE SPECIFIC EMBODIMENTS

The polymer/polyol compositions of this invention are liquid, stable dispersions of polymer in a polyol.

Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like. A preferred class of alkylene oxide adducts of polyhydroxyalkanes are the ethylene oxide and propylene oxide adducts of trihydroxyalkanes.

The polyols employed can have hydroxyl numbers which vary over a wide range. In general, the hydroxyl numbers of the polyols employed in the invention can range from about 20, and lower, to about 850, and higher. The hydroxyl number is defined as the number of milligrams of potassium hydroxide required for the complete hydrolysis of the fully phthalated derivative prepared from 1 gram of polyols. The hydroxyl number can also be defined by the equation:

$$OH = \frac{56.1 \times 1000 \times f}{m.w.}$$

where
OH = hydroxyl number of the polyol;
f = functionality, that is, average number of hydroxyl groups per molecule of polyol;
m.w. = molecular weight of the polyol.

The exact polyol employed depends upon the end-use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of more than 150 for rigid foams, from about 50 to about 150 for semi-flexible foams, and from about 20 to about 70 for flexible foams. Such limits are not intended to be restrictive, but are merely illustrative of the large number of possible combinations of the above polyol coreactants.

If desired, a polyol blend containing a small amount of a high molecular weight polyol and a major amount of a glycol or a low or a medium molecular weight polyol can be used. Also, a polyol-polymer/polyol blend containing a small amount of a polymer/polyol (prepared in a high molecular weight polyol) and a major amount of a glycol or a low or a medium molecular weight polyol, as disclosed in U.S. Patent Application Ser. No. 891,308 (filed Mar. 29, 1978) now Pat. No. 4,148,840, can be used as the polyol component.

The most preferred polyols employed in this invention include the poly(oxypropylene)glycols, triols, and higher functionality polyols capped with ethylene oxide. These polyols also include poly(oxypropyleneoxyethylene)polyols; however, desirably, the oxyethylene content should comprise less than 80 percent of the total and preferably less than 60 percent. The ethylene oxide when used can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. As taught by Stamberger (U.S. Pat. Nos. 3,304,273, 3,383,351, and Re. 28,715), unsaturation in itself does not affect in any adverse way the formation of the polymer/polyols in accordance with the present invention except in the case where the extent or type of unsaturation is so high or effective as to result in a crosslinked polymer.

The monomers which are utilized in the practice of this invention are acrylonitrile and vinylidene chloride. The relative amount by weight of vinylidene chloride in the monomer feed can range from about 5 to about 45 percent, and is preferably from about 10 to about 30 percent. A portion of the acrylonitrile in the monomer feed can be replaced with another monomer, such as styrene, but at least about 20 percent of the monomer feed should be acrylonitrile, and the vinylidene chloride level in the monomer feed should not drop below about 5 percent. Other monomers which can be utilized in the monomer feed in place of some of the acrylonitrile are methacrylonitrile, methyl methacrylate, and α-methylstyrene.

The process used in producing the polymer/polyol compositions of this invention involves polymerizing the monomers in the polyol while maintaining a low monomer to polyol ratio throughout the reaction mixture during the polymerization. Such low ratios are achieved by employing process conditions that provide rapid conversion of monomer to polymer. In practice, a low monomer to polyol ratio is maintained, in the case of continuous operation, by control of the temperature and mixing conditions. The temperature employed is any temperature at which the half life of the catalyst is no longer than about six minutes. The mixing conditions employed are those attained using a back-mixed reactor (e.g., a stirred flask or stirred autoclave.) Such reactors keep the reaction mixture relatively homogeneous and so prevent localized high monomer to polyol ratios such as occur in certain tubular reactors (e.g., in the first stage of "Marco" reactors when such reactors are operated conventionally with all the monomer added to the first stage). However, tubular reactors (e.g., Marco reactors) can be employed if modified so that increments of the monomer are added to various stages.

Residence times are not narrowly critical, but should be as short as possible to minimize prolonged exposure at high temperatures.

The crude polymer/polyol compositions usually contain small amounts of unreacted monomers. Such residual monomers can be converted to additional polymer by employing a two-stage operation. After two-stage operation, there will be small amount of unreacted monomers left that can be removed by using a continuous stripping system.

The temperature used in producing polymer/polyol compositions in accordance with this invention is any temperature at which the half life of the catalyst is no longer than about six minutes (preferably no longer than from 1.5 to 2 minutes). In the case of a continuous process, reaction temperatures of greater than 100° C. are preferred. The half-lives of the catalysts become shorter as the temperature is raised. The maximum temperature used is not narrowly critical but should be lower than the temperature at which significant decomposition of the reactants or product occurs. By way of illustration, 2,2'-azobis(isobutyronitrile) has a half life of six minutes at 100° C. The preferred temperature range is from 105° C. to 135° C. for the 2,2'-azobis(isobutyronitrile)initiated continuous process.

The catalyst concentration is not critical and can range from 0.1 to 5.0 weight percent in the total feed to the reactor. Increasing the catalyst concentration, up to a certain point, results in increased monomer conversion, but above that point does not substantially increase conversion. On the other hand, the catalyst concentration selected is usually an optimum value considering all factors including cost. Any free-radical type of vinyl polymerization catalyst can be used. However, 2,2'-azobis(isobutyronitrile) is preferred because it does not increase the acid number of the product, does not impart an objectionable odor to the product, and does not require special handling, as compared to certain peroxide catalysts.

The concentration of polyvinylidene chloride in the copolymer produced is usually lower than the vinylidene chloride concentration in the monomer feed because of lower conversion of vinylidene chloride. For example, if acrylonitrile and vinylidene chloride monomer were fed at a ratio of 80 to 20, resulting copolymer would have a polyacrylonitrile to polyvinylidene chloride ratio of about 84/16.

In order to be acceptable commercially, a polymer/polyol composition must be stable against phase separation. The stability should be sufficient to allow for relatively long term storage without the loss of processability. The polymer/polyol compositions must possess sufficiently small particles so that filters, pumps, and similar components of reactors do not become plugged or fouled in short periods of time. Stable dispersion of the polymer particles in the polyol is of prime consideration in insuring that the polymer/polyols can be processed in commercial production equipment without the necessity of additional mixing to insure homogeneity.

It had been recognized that the stability of polymer/polyols requires the presence of a minor amount of a graft or addition copolymer which is formed in situ from the polymer and the polyol. It has been found recently that stability can be achieved also with a preformed copolymeric stabilizer, as disclosed for example in Belgian Pat. No. 862,004.

Stability has been achieved by employing a free-radical catalyst and utilizing process conditions which promote rapid conversion of monomer to polymer. In practice, a lower monomer to polyol ratio is maintained by control of the reaction temperature and mixing conditions in the case of a continuous or a semi-batch operation and, in the case of a semi-batch operation, by slow addition of the monomer to the polyol. A back-mixed reactor (e.g., a stirred flask or a stirred autoclave) keeps the reaction mixture relatively homogeneous and so prevents localized high monomer to polyol ratios. The catalyst and temperature are chosen so that the catalyst has a desirable rate of decomposition with respect to residence time in the reactor for a continuous process or to the feed time for a semi-batch process. The half-life of the catalyst at the temperature utilized should be short compared to the time the reactants are in the reaction zone.

Another factor known to affect stability is the molecular weight of the polyol. Generally, the higher the molecular weight, the better the dispersion stability. In case of low molecular weight polyols, the dispersion stability can be improved by using either the polyol blend technique as disclosed in Shah U.S. Application Ser. No. 797,666 (filed May 17, 1977) now U.S. Pat. No. 4,119,586 or the polyol-polymer/polyol blend technique as disclosed in Shah U.S. Application Serial No. 891,308 (filed Mar. 29, 1978) now U.S. Pat. No. 4,148,840.

Finally, the nature of the monomer affects particle size and hence stability also. For example. when high concentrations of styrene are used, the particles will tend to be larger.

The polymer/polyols of this invention, which can be made by the continuous process described herein, are dispersions in which the polymer particles (either individual particles or agglomerates of individual particles) are relatively small in size. In the most preferred embodiment, almost all are less than about one to three microns and will pass through the filter employed in the filtration hindrance (filterability) test that will be described in conjunction with the Examples. This insures that the polymer/polyol compositions can be processed successfully in the sophisticated machine systems now in use for the large volume production of polyurethane products, including those employing impingement-type mixing which necessitates the use of filters that cannot tolerate any significant amount of relatively large particles.

The filtration hindrance test is the most rigorous test of polymer/polyol stability. Commercially stable polymer/polyols for a variety of applications may be satisfactorily defined by their centrifugible solids level and by the Clear Layer Before Tipping test, both of which are likewise described in connection with the Examples.

To minimize the problem of dehydrochlorination at high reaction and stripping temperature (>100° C.), the concentration of vinylidene chloride in the monomer feed should be kept minor (45 percent maximum, preferably less than 35 percent) and the continuous process having the shortest possible residence time (instead of a semi-batch process) should be employed. Products prepared according to these teachings still have higher acid number compared with typical acid number of 0.03 of many commerical polymer/polyols. However, they have very little discoloration and also good shelf-life stability as measured by acid number and viscosity of the product. Also, foams produced by such products have acceptable properties.

The use of an epoxidized oil and/or a metal stabilizer to prevent thermal degradation during processing and to extend the service life of finished products is known in the polyvinyl chloride compounding area. Surprisingly, however, not all of these stabilizers work in controlling dehydrochlorination in vinylidene chloride-polymer/polyols as they might be expected to, based upon the polyvinyl chloride experience. The acid number (which is indicative of the degree of dehydrochlorination) of the vinylidene chloride-polymer/polyols of the present invention can be lowered to an acceptable level by adding an epoxy plasticizer to the unstripped product. In a preferred embodiment, an epoxidized oil is added to the polyol stream before polymerization. For example, small amounts of epoxidized soybean oil (e.g., Flexol ® Plasticizer EPO) or octyl epoxytallate (e.g., Flexol ® Plasticizer EP-8) have been found to be efficacious in controlling dehydrochlorination according to this invention. However, when barium-cadmium or barium-cadmium-zinc stabilizers were evaluated, they not only were ineffective in controlling dehydrochlorination but they also nullified the positive effect of the epoxidized oil, a result quite contrary to the experience in the polyvinyl chloride compounding area.

The invention also provides novel polyurethane products produced by reacting: (a) a polymer/polyol composition of this invention and (b) an organic polyisocyanate in the presence of (c) a catalyst. The reaction can be performed in any suitable manner such as by the prepolymer or one-shot technique. When the polyurethane is a foam, the reaction mixture usually also contains a polyol such as the one used to make the polymer/polyol, a blowing agent, and a foam stabilizer.

The organic polyisocyanates that are useful in producing polyurethanes in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate; 3,3'-diphenylmethylene diisocyanate; and polymethylene poly(-phenyleneisocyanates) having the formula:

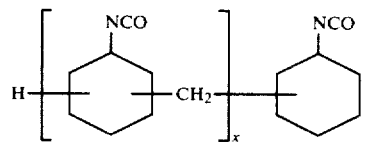

wherein x has an average value from 1.1 to 5 inclusive (preferably from 2.0 to 3.0). The preferred polyisocyanate is a mixture of 80% 2,4-tolylene diisocyanate and 20% 2,6-tolylene diisocyanate.

The catalysts that are useful in producing polyurethane in accordance with this invention include: tertiary amines such as bis(2,2'-dimethylaminoethyl)ether, trimethylamine, triethylamine, N-methylmorpholine, N-ethylmorpholine, N,N-dimethylethanolamine, N,N,N',N'-tetramethyl-1,3-butanediamine, triethanolamine, 1,4-diazabicyclo[2.2.2]octane, pyridine oxide, and the like, and organotin compounds such as dialkyltin salts of carboxylic acids, e.g. dibutyltin diacetate, dibutyltin dilaurate, dibutyltin maleate, dilauryltin diacetate, dioctyltin diacetate, and the like. Similarly, there may be used a trialkyltin hydroxide, dialkyltin oxide, dialkyltin dialkoxide, or dialkyltin dichloride. Examples of these compounds include trimethyltin hydroxide, tribultin hydroxide, trioctyltin hydroxide, dibutyltin oxide, dioctyltin dichloride, and the like. The catalysts are employed in small amounts, for example, from about 0.001 percent to about 5 percent based on weight of the reaction mixture.

The blowing agents useful in producing polyurethane foams in accordance with this invention include water and halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

The foam stabilizers useful in producing polyurethane foams in accordance with this invention include "hydrolyzable" polysiloxane-polyoxyalkylene block copolymer such as the block copolymers described in U.S. Pat. Nos. 2,834,748 and 2,917,480. Another useful class of foam stabilizers includes the "non-hydrolyzable" polysiloxane-polyoxyalkylene block copolymers such as the block copolymers described in U.S. Pat. Nos. 3,505,377 and 3,686,254 and British Patent Specification 1,220,471. Yet another useful class of foam stabilizers is composed of the cyanonalkyl-polysiloxanes, as described in U.S. Pat. No. 3,905,924.

Polyurethane products produced in accordance with this invention are useful in the applications in which polyurethanes made from conventional polymer/polyol compositions are employed. The polymer/polyol compositions of this invention are particularly useful in the production of high resiliency foams for use in arm rests, crash pads, mattresses, and automobile bumpers.

The Examples which follow are intended to illustrate further the invention described herein. They are not intended to limit the invention in any way.

DEFINITIONS

As used in the Examples appearing infra, each of the following designations, symbols, terms, or abbreviations has the indicated significance:

Polyol 27: A polypropylene oxide-polyethylene oxide triol made from propylene and ethylene oxides and glycerine and having a theoretical number average molecular weight of about 6000 and a hydroxyl number of about 27.5. The alkylene oxide units are present primarily in blocks and the end units are substantially all ethylene oxide units, i.e., the ethylene oxide is used to "cap" the triol. Based on its total weight, this triol contains about 14 wt. % $C_2H_4O$.

Polyol 28: A polypropylene oxide-polyethylene oxide polyol made from propylene and ethylene oxides, sorbitol, and glycerine, having a theoretical number average molecular weight of about 10,800 and a hydroxyl number of about 29.55. The alkylene oxide units are present primarily in blocks and the end units are substantially all ethylene oxide units, i.e., the ethylene oxide is used to "cap" the triol. The polyol contains about 8.6 wt. % ethylene oxide units based on the total product weight.

Polyol 34: A highly reactive capped polyether triol having a theoretical number average molecular weight of 4740 and a hydroxyl number of 36.8. The polyol contains 14 wt. % $C_2H_4O$.

Polyol 46: A polypropylene oxide-polyethylene oxide triol made from propylene oxide, ethylene oxide, and glycerine and having a theoretical number average molecular weight of about 3600 and a hydroxyl number of about 46.7. Substantially all of the ethylene oxide units are disposed internally, i.e. substantially none of them form end units. Based on its total weight, the polyol contains about 14 wt. % $C_2H_4O$.

Polyol 56: A polypropylene oxide-polyethylene oxide triol made from propylene oxide, ethylene oxide, and glycerine and having a theoretical number average molecular weight of about 3000 and a hydroxyl number of 56.4. Substantially all the ethylene oxide units are disposed internally, i.e., substantially none of them form end units. Based on its total weight, this polyol contains about 8 wt. % $C_2H_4O$.

Polymer/Polyol S: A polymer/polyol prepared with an acrylonitrile:styrene monomer mixture (40:60 ratio) in Polyol 27, utilizing a tert-butylperoctoate catalyst. Total polymer content: 22.34%. Brookfield viscosity: 7240 cps at 25° C.

EPO: Flexol ® Plasticizer EPO, an epoxidized soybean oil.

EP-8: Flexol ® Plasticizer EP-8, an octyl epoxytallate.

T-101: Thermolin ® 101, a flame retardant available from Olin Corporation.

A: Acrylonitrile.

S: Styrene.

$VCl_2$: Vinylidene Chloride.

TMSN: Tetramethylsuccinonitrile.

CSTR: Continuously stirred tank reactor.

Catalyst A-1: A solution consisting of 70% bis(2-dimethylaminoethyl)ether and 30% dipropyleneglycol.

Catalyst A-6: A mixture consisting of 27% bis(2-dimethylaminoethyl)ether and 73% dimethylaminoethoxyethanol.

Catalyst 33: A solution consisting of 33% triethylenediamine and 67% dipropyleneglycol.

Silicone L: A surfactant of the formula

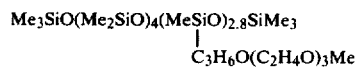

wherein Me represents methyl, as described in U.S. Pat. No. 3,471,917.

Silicone Y: A mixture of Silicone L and a surfactant of the formula

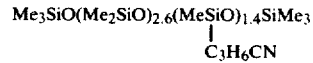

wherein Me represents methyl, as described in U.S. Pat. No. 3,905,924.

Isocyanate TDI: A mixture of 80% 2,4-tolylenediisocyanate and 20% 2,6-tolylene-diisocyanate.

POLYMER/POLYOL PREPARATION

All of the polymer/polyols of the Examples tabulated in Tables I-VI were prepared in a continuous reaction system. The reactions were conducted continuously in a 550 cubic centimeter continuously stirred tank reactor (CSTR) filled with baffles and an impeller generally run at 800 RPM. The feed components were pumped to the reactor continuously after going through an inline mixer to assure complete mixing of the feed components before entering the reactor. The internal temperature of the reactor was controlled to within one degree Centigrade by applying controlled heating or cooling to the outside of the reactor. The product from the reactor flowed out through a back pressure regulator. The regulator was adjusted to give 10 pounds per square inch gauge back pressure in the reactor. Then the product flowed through a water cooled tubular heat exchanger to a product receiver. Portions of the crude product were vacuum stripped at 2 millimeters pressure and 120° to 130° C. for testing. Conversions were determined from gas chromatic analysis of the amount of unreacted monomers present in the crude product before stripping. A summary of the conditions and product properties for the Examples is presented in Tables I-VI.

POLYMER/POLYOL PROPERTIES

Filtration Hindrance: The preferred compositions of this invention are essentially free of polymer particles having diameters over 30 microns. A composition meets this criteria if over 99 weight percent of the composition passes successively through a 150 mesh screen and a 700 mesh screen in the following test: A 470 gram stripped sample of the composition being tested is diluted with 940 grams of anhydrous isopropanol to reduce viscosity effects. The diluted sample is passed through a 2.4 square inch 150 mesh screen and then through a 2.4 square inch 700 mesh screen. (The screens are cleaned, dried, and weighed before the test.) Then the screens are washed with isopropanol to remove any polyol, dried, and weighed. The difference between the final and initial screen weights corresponds to the amount of polymer that did not pass through the screens. The 150 mesh screen has a square mesh with average mesh opening of 105 microns and it is a "Standard Tyler" 150 square mesh screen. The 700 mesh screen is made with a Dutch twill weave having average mesh openings of 30 microns and is described in Bulletin 46267-R of the Ronningen-Petter Company of Kalamazoo, Michigan.

Centrifugible Solids: The polymer/polyol composition is centrifuged for about 24 hours at about 3000 revolutions per minute and 1470 "G" radial centrifugal force. Then the centrifuge tube is inverted and allowed to drain for four hours. The non-flowing cake remaining at the bottom of the tube is reported as weight percent of the initial weight of the composition tested.

Clear Layer Before Tipping: The polymer/polyol composition is placed in a small test tube and centrifuged for about 24 hours after which time the liquid in the test tube is observed and the height of the clear layer on the top is measured. This height is given as a percentage of the height of the liquid in the test tube.

EXPERIMENTAL RESULTS

The effects of acrylonitrile/vinylidene chloride (A/VCl$_2$) ratio, acrylonitrile/styrene/vinylidene chloride (A/S/VCl$_2$) ratio, monomer content in the feed, residence time, catalyst concentration, reaction temperature, and two stage operation on monomer conversion and product properties were studied. These variables are discussed below in the same order:

Conversions of acrylonitrile and vinylidene chloride decrease significantly as concentration of vinylidene chloride increases in the monomer mix. Vinylidene chloride has lower conversion compared with acrylonitrile over the entire range of A/VCl$_2$ ratio. For example, a product has Poly A/Poly VCl$_2$ ratio of 84/16 for monomer feed having a 80/20 ratio of A/VCl$_2$.

The acid number of the product increases as concentration of vinylidene chloride increases in the monomer mix, indicating an increased degree of dehydrochlorination associated with vinylidene chloride during stripping. It should be noted that these products were batch-stripped requiring long times (about 2-3 hours) compared with the continuous process of relatively short residence time (18 minutes). The acid numbers of the products were also affected by the stripping temperature (90°-100° C.). This is because of the higher degree of dehydrochlorination, caused by prolonged exposure at higher temperature. As discussed infra, dehydrochlorination (and hence acid number of the product) can be controlled by addition of one to one and half percent of epoxidized soybean oil. It should be noted that some difficulty in determination of end-point for acid number analysis was experienced. Therefore, acid number values of the same product varied depending on the observer.

Another effect of A/VCl$_2$ ratio was on hydroxyl number analysis of the products. Difference between calculated and measured hydroxyl number of the product becomes larger, as the concentration of vinylidene chloride increases in the monomer mix. For example, this difference is of only 0.66 unit at a 90/10 A/VCl$_2$ ratio, while it is of 8.29 units at a 30/70 A/VCl$_2$ ratio. Again, this can be explained on the basis of the higher degree of dehydrochlorination at the lower ratio of A/VCl$_2$.

The product color is greatly affected by A/VCl$_2$ ratio, ranging from light yellow (at 90/10 and 80/20) to dark brown (at 30/70). Color is also adversely affected by higher stripping temperature, when the concentration of vinylidene chloride in the monomer mix is greater than 30 percent. For example, the product made with a 60/40 A/VCl$_2$ monomer feed and stripped at 120° C. had dark yellow (or beige) color, while it had light yellow color when it was stripped below 100° C. Again, this is because of the higher degree of dehydrochlorination caused by higher concentration of vinylidene chloride in the monomer mix and higher stripping temperature.

The most significant effect of A/VCl$_2$ ratio is on polymer particle size. Polymer particle size decreases as concentration of vinylidene chloride in monomer mix increases. This is also confirmed by the increase in light transmission values. Compared with either acrylonitrile-styrene copolymer or acrylonitrile-styrene-vinylidene chloride copolymer, acrylonitrile-vinylidene chloride copolymer has smaller particles and fewer particle agglomerates. Therefore, the products containing this copolymer have not only good dispersion stability and filter-ability, but also Effects of A/VCl$_2$ ratio on filter-ability and centrifugible solids were not noticed. One possible reason may be the use of a high molecular weight polyol (Polyol 27) instead of a low molecular weight polyol such as Polyol 56.

The effect of A/VCl$_2$ ratio on the product viscosity is not significant.

Styrene in acrylonitrile-vinylidene chloride monomer system was used mainly because styrene is less expensive and minimizes "scorch" of the foam. A number of polymer/polyols were prepared at different A/S/VCl$_2$ ratios in a variety of base polyols such as Polyols 27, 34, 46, and 56 (refer to Tables II and IV-VI). The concentration of vinylidene chloride in the monomer mixes was limited to twenty percent.

As the concentration of styrene in the monomer mix increases, the size of the polymer particles increases. This is also confirmed by lower light transmission values (refer to Examples 1 and 3 of Table II). It also adversely affects dispersion stability of polymer/polyols, as measured by centrifugible solids. All known effects of styrene in acrylonitrile-styrene monomer system are also applicable to A/S/VCl$_2$ systems.

Generally monomer content affects monomer conversions and product properties such as dispersion stability, filter-ability, and viscosity. An increase in monomer concentration increases monomer conversions because the residual monomers do not increase appreciably. Comparing the vinylidene chloride conversion data of Examples 4 and 5 of Table II, it is seen that vinylidene chloride conversion increases from 54.3 to 73.6 percent when monomer concentration is increased from 23.3 to 30.7 percent, even though the concentration of vinylidene chloride in the monomer mix fed is the same in both runs. Therefore, higher monomer content (~30 percent) in the feed is preferred for improved conversion of vinylidene chloride.

In case of the conventional 2,2'-azobis(isobutyronitrile) process, such a high monomer content dictates the need for higher concentration of acrylonitrile (~70 percent) in the monomer mix and use of a high molecular weight polyol (Polyol 34) to overcome any adverse effect on dispersion stability and filterability (refer to Example 5 of Table II or Table V). If higher concentration of styrene (~60 percent) in monomer feed and a low molecular weight polyol are desired from an application viewpoint, the problem of poor dispersion stability and filterability of a high solids product can be overcome by employing either polyol blend or polymer/polyol addition technology (refer to Table VI).

The effect of base polyol molecular weight was studied in case of A/S/VCl$_2$ monomer system. By comparing centrifugible solids data of Examples 4, 6, and 7 of Table II, the effect of base polyol molecular weight on dispersion stability (as measured by centrifugible solids) of polymer polyols is clearly seen. As expected, a high molecular weight base polyol yields a polymer polyol with better dispersion stability in the case of the conventional 2,2'-azobis(isobutyronitrile) process. However, any adverse effect of a low molecular weight polyol on the dispersion stability of the product can be overcome by using polyol blend or polymer/polyol addition technology [compare Examples 6 and 7 of Table II with Examples 1 (or 3) and 2 of Table VI, respectively].

By comparing monomer conversion data of Examples 1, 4, and 6, it is seen that there is no effect of residence time on monomer conversions, when it is varied from 12 to 18 minutes. This effect is very similar to that found for the acrylonitrile-styrene monomer system. It is assumed that small differences in the concentration of styrene (30 instead of 40 percent) in the monomer feed will not have any significant effect on monomer conversions.

The effect of catalyst concentration was studied over the range of 0.2 to 0.8 weight percent of the total feed. Increasing the catalyst [2,2'-azobis(isobutyronitrile)] concentration increases monomer conversions significantly up to an upper limit (0.6 percent) above which higher concentrations of catalyst increase monomer conversions very gradually. No effects of catalyst concentration on the product stability, filterability, and viscosity were noticed.

An unsuccessful attempt was made to prepare a polymer/polyol with an 80/20 A/VCl$_2$ ratio in Polyol 27 at a reaction temperature of 95° C. in the continuous process described earlier. It was very difficult to control the temperature. It varied from 73° to 110° C. during the line-out period. The reaction system was shut down early and checked. No polymer build-up or seeds were found in the reactor. Possibly at such a low temperature, monomer conversions may be very low causing a drop in reaction temperature and an increase in the concentration of unreacted monomers in the reactor. The latter in turn caused sudden exotherms in the reaction mixture. The main reason to try such a low temperature was to minimize the degree of dehydrochlorination.

The run was repeated at a higher reaction temperature (120° C.) successfully (refer to Example 2 of Table I). Surprisingly, the product color was light yellow, indicating very little (if any) dehydrochlorination because of relatively very short residence time of the continuous process, compared with the hold-up time of a typical batch or semi-batch process. Thus, use of the continuous process enables the preparation of polymer/polyols containing vinylidene chloride at higher reaction temperature without any increase in the degree of dehydrochlorination and product color.

Thereafter, most of the experimental work has carried out at 120° C. The effect of reaction temperature was studied over the range of 110° to 130° C. in the case of a polymer polyol made with a 40/40/20 A/S/VCl$_2$ ratio in Polyol 56 (refer to Examples 3, 6, and 7 of Table IV). The product made at 130° C. was somewhat higher in viscosity (1320 versus 980 cps at 25° C.) compared with that of the product made at either 120° C. or 110° C. One possible explanation is the increase in amount of particle agglomerates. This is further supported by centrifugible solids data of Examples 3 (or 7) and 6(16–17.8 versus 21.7 percent at 130° C.). Another important effect of reaction temperature is on monomer conversions. Combined monomer conversion is very low (67.2 percent) at 110° C., while it is about 75 percent at both 120° and 130° C. Thus, considering the effect of reaction temperature on monomer conversion and product properties, the suggested reaction temperature for preparation of polymer/polyols containing a significant amount of polystyrene in the A/S/VCl$_2$ copolymer is 120° C.

The effect of reaction temperature in the case of a high solids polymer/polyol made with a 70/10/20 A/S/VCl$_2$ ratio in Polyol 34 was studied over the range of 110° to 120° C. (refer to Examples 2–4 of Table V). Surprisingly, monomer conversions are almost identical over this temperature range. There was no effect of reaction temperature on product viscosity.

Most of the runs were made using as a first stage a back-mixed reactor (550 cc volume). Use of a second stage (consisting of an unagitated column having L/D ratio of 5:1 and 550 cc volume) increased the combined monomer conversion by about 5–6 percent without affecting the product properties. To verify this earlier finding, one run was made using two stage operation (refer to Examples 1 and 2 of Table V). Monomer conversion and product properties data of these runs support the earlier finding.

Table VI is demonstrative of other variations in the process technologies which can be utilized according to the present invention. In Examples 1 and 2, polyol blend technology was employed in the process. If the desired concentration of styrene in the monomer feed is more than 40 percent, polymer/polyol addition technology should be employed to overcome the problem of product stability as shown by data of Examples 3 and 4.

Dehydrochlorination associated with the use of vinylidene chloride in the preparation of polymer/polyols can yield a discolored product with higher acid numbers. Such a degraded product can adversely affect the foaming characteristics. To minimize the problem of dehydrochlorination at higher reaction and stripping temperature, the concentration of vinylidene chloride in the monomer feed should be kept at a minimum (about 20 percent) and the continuous process should be employed. The resulting polymer/polyols have a higher acid number than the typical acid number of 0.03 of many commercial polymer/polyols. However, they have the typical light yellow color and good shelf life stability.

Small amounts of either epoxidized soybean oil or epoxytallate were added to unstripped polymer polyols prior to stripping (refer to Table III). The acid number of the stripped products indicated that both were almost equally effective in eliminating dehydrochlorination.

Stripping of control samples indicated that the major part of dehydrochlorination occurred during stripping. The required amount of either EPO or EP-8 was about one and half percent for obtaining a product with acid number of 0.05 maximum.

Since a continuous stripping system can be incorporated with the reactor, it is convenient to add EPO before polymerization. Also, this will eliminate any possible dehydrochlorination occuring during polymerization. From these viewpoints, further work was carried out by mixing EPO with the base polyol prior to the polymerization reaction (refer to Tables IV-VI). As shown by acid number data in Table IV, the required concentration of EPO in the feed is about one percent for a product with a maximum acid number of 0.05 and containing about 18 percent of a 40/40/20 A/S/VCl$_2$ copolymer. For a high-solids polymer/polyol made with a 70/10/20 A/S/VCl$_2$ monomer feed, the required concentration of EPO in the feed is about one and half percent (refer to Table V).

TABLE I

PREPARATION OF ACRYLONITRILE:VINYLIDENE CHLORIDE-POLYMER/POLYOLS
EFFECT OF A:VCl$_2$ RATIO ON MONOMER CONVERSION AND ACID NUMBER OF POLYMER/POLYOLS (Single-stage runs were made in a continuous bench-scale unit[1]. The polyol utilized was Polyol 27. The total feed contained 0.79 weight percent 2,2'-azobis(isobutyronitrile) catalyst. The temperature was 120° C. and the residence time was 18 minutes.)

| Example I | 1 | 2 | 3 | 4 | 5 | 6 | 7* | 8* | 9* |
|---|---|---|---|---|---|---|---|---|---|
| Monomer Content in Feed, wt% | 22 | 20 | 21 | 21 | 20 | 20 | 20 | 22 | 19 |
| Ratio of Acrylonitrile (A) to Vinylidene Chloride (VCl$_2$) in Feed, wt% | 90/10 | 80/20 | 70/30 | 70/30 | 60/40 | 60/40 | 50/50 | 40/60 | 30/70 |
| Polyol + Catalyst Feed Rate, gm/hr | 1454 | 1440 | 1448 | 1448 | 1448 | 1448 | 1441 | 1414 | 1422 |
| Monomer Feed Rate, gm/hr | 400 | 367 | 380 | 380 | 366 | 366 | 366 | 390 | 331 |
| Product Weight, gm/hr | 1842 | 1796 | 1805 | 1805 | 1790 | 1790 | 1790 | 1769 | 1766 |
| Stripping (Batch) Temperature, °C.[2] | 95/100 | 120 | 120 | 95/100 | 120 | 95/100 | 90 | 100 | 90 |
| Conversions: A, % | 85 | 78 | 72 | 72 | 61 | 61 | 61 | 57 | 50 |
| VCl$_2$, % | 69 | 61 | 54 | 54 | 43 | 43 | 45 | 43 | 40 |
| Combined, % | 83 | 75 | 67 | 67 | 54 | 54 | 53 | 48 | 43 |
| Poly-A in Stripped Product[3] | 17 | 13 | 11 | 11 | 8 | 8 | 7 | 6 | 3 |
| Poly-VCl$_2$ in Stripped Product[3] | 2 | 3 | 4 | 4 | 4 | 4 | 5 | 6 | 6 |
| Total Polymer in Product[3] | 19 | 16 | 15 | 15 | 12 | 12 | 12 | 12 | 9 |
| Ratio of Poly-A to Poly-VCl$_2$ in Product[3] | 92:80 | 84:16 | 76:24 | 76:24 | 68:32 | 68:32 | 57:43 | 47:53 | 35:65 |
| Product Properties | | | | | | | | | |
| Product Color | yellow | light yellow | light yellow | light yellow | bg.(drk. yellow | light yellow | light yellow | light beige | brown |
| Brookfield Viscosity at 25° C., cps | 3750 | 3050 | 2860 | 2860 | 2500 | — | 2550 | 2680 | 2450 |
| Light Transmission, %[4] | 89.5 | 88.5 | 89.0 | 89.0 | 93.0 | — | 93.5 | 95.0 | 97.5 |
| Calculated Hydroxyl No., mgKOH/gm[5] | 22.56 | 23.29 | 23.59 | 23.59 | 24.41 | — | 24.50 | 24.46 | 25.21 |
| Measured Hydroxyl No., mgKOH/gm[6] | 21.90 | 20.74 | 19.18 | — | 19.30 | — | 18.74 | 17.21 | 16.92 |
| Acid No., mgKOH/gm: by EBM[7] | 0.27 | 0.98 | 1.79 | — | 1.57 | — | 0.96 | 0.93 | 0.77 |
| by ECS[7] | — | 0.676 | 1.189 | 0.417 | 1.247 | 0.641 | 0.768 | 0.743 | — |
| by CVD[7] | 0.056 | 0.269 | 0.645 | 0.185 | 0.656 | 0.258 | 0.348 | 0.415 | 0.337 |
| Filtration Hindrance[8] | | | | | | | | | |
| 150 Mesh Screen, Solids on Screen, ppm | 13 | 13 | 13 | — | 55 | — | 10 | 11 | 13 |
| 700 Mesh Screen, Solids on Screen, ppm | 20 | 20 | 11 | — | 80 | — | 14 | 10 | 17 |
| 700 Mesh Screen, Time, sec. | 270 | 342 | 337 | — | 332 | — | 331 | 353 | 367 |
| Centrifugible Solids, Stripped, wt% | 1.51 | 1.45 | 1.35 | — | 1.28 | — | 1.15 | 1.23 | 1.13 |
| Clear Layer Before Tipping, % | 0 | 0 | 0 | — | 0 | — | 0 | 0 | 0 |

Footnotes for Table I
[1]First-stage reactor: CSTR of 550 cc volume; agitator speed: 800 rpm; start-up: using related polyol and catalyst blend and related monomer mix. Monomer concentration, which was lower than desired level in the beginning, was gradually increased. Catalyst was completely dissolved in the related polyol by mixing at 40° C. for about 4 hours.
[2]The product was sparged with nitrogen during stripping at 90°-110° C., but not at 120° C.
[3]Calculated weight percent.
[4]500 millimicrons with 0.01% polymer in a diluent consisting of a polyoxypropylene triol derived from glycerine and having a hydroxyl number of 56.
[5]Calculation based on calculated total polymer content and hydroxyl number of base polyol.
[6]Difference between calculated and measured hydroxyl number is significant over A/VCl$_2$ range of 70/30 to 30/70 presumably because of dehydrohalogenation during cook-out period.
[7]Had difficulty in determining end-point for acid number analysis. Therefore, results varied from person to person.
[8]100% through in each case tested.
*Not within the scope of the present invention.

TABLE II

PREPARATION OF ACRYLONITRILE-STYRENE-VINYLIDENE CHLORIDE POLYMER/POLYOLS
SINGLE-STAGE
RUNS MADE IN CONTINUOUS BENCH-SCALE UNIT[1] UTILIZING 2,2'-AZOBIS(ISOBUTYRONITRILE) CATALYST

| Example II | 1 | 2 | 3 | 4 | 5 | 6 | 7 | 8 | 9 | 10 |
|---|---|---|---|---|---|---|---|---|---|---|
| Type of Polyol | 27 | → | → | 34 | → | 46 | 56 | → | → | → |
| Reaction Temperature, °C. | 120 | → | → | → | → | → | → | → | → | → |
| Residence Time, min. | 17 | 18 | 18 | 12 | → | → | → | → | → | → |
| Catalyst Concentration, wt.% of total feed | 0.79 | 0.79 | 0.79 | 0.76 | 0.69 | 0.79 | 0.79 | 0.78 | 0.63 | 0.47 |
| Monomer Content in Feed, wt% | 20.41 | 19.69 | 20.82 | 23.28 | 30.72 | 20.79 | 20.38 | 20.84 | 20.97 | 20.57 |
| Acrylonitrile/Styrene/ VCl$_2$ Ratio, wt% | 50/30/20 | 25/55/20 | 40/40/20 | 70/10/20 | 40/40/20 | → | → | → | → | |
| Polyol + Catalyst Feed Rate, gm/hr | 1529 | 1493 | 1464 | 2112 | 1917 | 2195 | 2243 | 2176 | 2182 | 2224 |
| Monomer Feed Rate gm/hr | 392 | 366 | 385 | 641 | 850 | 576 | 574 | 573 | 579 | 576 |

TABLE II-continued
PREPARATION OF ACRYLONITRILE-STYRENE-VINYLIDENE CHLORIDE POLYMER/POLYOLS
SINGLE-STAGE
RUNS MADE IN CONTINUOUS BENCH-SCALE UNIT[1] UTILIZING 2,2'-AZOBIS(ISOBUTYRONITRILE) CATALYST

| Example II | 1 | 2 | 3 | 4 | 5 | 6 | 7 | 8 | 9 | 10 |
|---|---|---|---|---|---|---|---|---|---|---|
| Product Weight, gm/hr | 1912 | 1852 | 1834 | 2749 | 2755 | 2756 | 2802 | 2733 | 2735 | 2780 |
| Material Balance, % | 99.53 | 99.62 | 99.19 | 99.85 | 99.57 | 99.46 | 99.47 | 99.42 | 99.06 | 99.28 |
| Stripping (Batch) Temperature, °C.[2] | 120-125 | 120-125 | 120-125 | 120-125 | 130 | 120-125 | 120-125 | 120-125 | 120-125 | 120-125 |
| Residual Acrylonitrile (A) in Unstripped Product, wt% | 2.04 | 1.42 | 1.16 | 2.04 | 2.89 | 1.93 | 1.83 | 2.04 | 2.12 | 2.46 |
| Styrene (S) in Unstripped Product, wt% | 0.49 | 0.87 | 1.82 | 0.91 | 0.13 | 0.97 | 0.92 | 0.92 | 0.91 | 1.09 |
| Vinylidene Chloride ($VCl_2$) in Unstripped Product, wt% | 1.66 | 1.22 | 2.12 | 2.13 | 1.63 | 1.87 | 1.77 | 2.05 | 1.91 | 2.11 |
| TMSN[3] in Unstripped Product, wt% | 0.18 | 0.28 | 0.30 | 0.21 | 0.15 | 0.27 | — | 0.25 | 0.20 | 0.12 |
| Conversions: | | | | | | | | | | |
| Acrylonitrile, % | 80.10 | 82.02 | 77.90 | 78.13 | 86.62 | 76.91 | 77.66 | 75.68 | 74.96 | 70.10 |
| Styrene, % | 92.03 | 90.22 | 84.24 | 90.24 | 95.79 | 88.40 | 88.77 | 89.03 | 89.25 | 86.75 |
| Vinylidene Chloride, % | 59.51 | 58.85 | 49.50 | 54.33 | 73.58 | 55.26 | 56.79 | 51.11 | 54.89 | 48.71 |
| Combined, % | 79.56 | 82.24 | 75.71 | 78.21 | 84.93 | 77.18 | 77.93 | 76.10 | 76.66 | 72.49 |
| Total Poly A in Stripped Product by Calc., wt% | 8.53 | 6.70 | 4.27 | 7.67 | 19.54 | 6.72 | 6.63 | 6.64 | 6.61 | 6.12 |
| Total Poly S in Stripped Product by Calc., wt% | 5.88 | 8.29 | 10.17 | 8.86 | 3.09 | 7.72 | 7.58 | 7.82 | 7.88 | 7.57 |
| Total Poly $VCl_2$ in Stripped Product by Calc., wt% | 2.54 | 1.80 | 2.17 | 2.67 | 4.74 | 2.41 | 2.42 | 2.24 | 2.42 | 2.12 |
| Total Polymer in Stripped Product by Calc., wt% | 16.95 | 16.79 | 16.61 | 19.19 | 27.36 | 16.85 | 16.63 | 16.70 | 16.91 | 15.81 |
| Poly A/Poly S/Poly $VCl_2$ Ratio in Stripped Product, wt% | 50.3/ 34.7/15.0 | 39.9/ 49.4/10.7 | 25.7/ 61.2/13.1 | 40/46.1/ 13.9 | 71.4/ 11.3/17.3 | 39.9/45.8/ 14.3 | 39.8/ 45.6/14.5 | 39.8/46.8/ 13.4 | 39.1/ 46.6/14.3 | 38.7/47.9/ 13.4 |
| Product Properties | | | | | | | | | | |
| Brookfield Viscosity at 25° C., cps | 2600 | 2610 | 3080 | 1840 | 2400 | 1312 | 1088 | 1183 | 1145 | 840 |
| Light Transmission, %[4] | 66.5 | 55.5 | 47.5 | 49.5 | 73.0 | 49.0 | 50.0 | 54.9 | 54.9 | 50.5 |
| Calculated Hydroxyl No., mgKOH/gm[5] | 23.03 | 23.08 | 23.13 | 27.86 | 25.04 | 38.47 | 48.20 | 46.54 | 46.51 | 47.21 |
| Measured Hydroxyl No., mgKOH/gm[6] | 21.30 | 22.07 | 22.35 | 27.20 | 22.95 | 36.49 | 45.31 | — | — | — |
| Acid No., mgKOH/gm: | | | | | | | | | | |
| by EBM[7] | 0.304 | 0.16 | 0.12 | 0.16 | — | 0.12 | 0.099 | — | — | — |
| by CVD[7] | 0.089 | 0.045 | 0.045 | 0.122 | 0.191 | 0.073 | 0.034 | — | — | — |
| Filtration Hindrance | | | | | | | | | | |
| 150 Mesh Screen, % Through | 100 | 100 | 100 | 100 | 100 | 100 | 100 | 100 | 100 | 100 |
| 150 Mesh Screen, Solids on Screen, ppm | 6 | 11 | 14 | 9 | 7 | 31 | 9 | 36 | 3 | 10 |
| 700 Mesh Screen, Time, sec. | 368 | 290 | 375 | 270 | 210 | 280 | 223 | 500 | 358 | 198 |
| 700 Mesh Screen, % Through | 100 | 100 | 100 | 100 | 100 | 100 | 100 | 19[8] | 100 | 100 |
| 700 Mesh Screen, Solids on Screen, ppm | 9 | 13 | 9 | 16 | 6 | 8 | 10 | 79 | 10 | 15 |
| Centrifugible Solids, Stripped, wt% | 2.15 | 2.40 | 5.62 | 6.69 | 2.02 | 8.93 | 15.80 | 20.05 | 23.50 | 17.93 |
| Clear Layer Before Tipping, % | 0 | 0 | 2 | 3 | 2 | 3 | 6 | 4 | 4 | 4 |

Footnotes for Table II
[1] First-stage reactor: CSTR of 550 cc volume; agitator speed: 800 rpm; start-up: using related polyol and catalyst blend and related monomer mix. Monomer concentration, which was lower than the desired level in the beginning, was gradually increased. Catalyst was completely dissolved in the related polyol by mixing at 40° C. for about 4 hours.
[2] The product was sparged with nitrogen during stripping.
[3] Tetramethylsuccinonitrile.
[4] 500 millimicrons with 0.01% polymer in a diluent consisting of a polyoxypropylene triol derived from glycerine and having a hydroxyl number of 56.
[5] Calculation based on calculated total polymer content and hydroxyl number of base polyol.
[6] Difference between calculated and measured hydroxyl number is not significant for products containing small amounts (20%) of polyvinylidene chloride.
[7] Had difficulty in determining end-point for acid number analysis. Therefore, results varied from person to person.
[8] Suspecting polymer seeds formation during start-up.

TABLE III

EVALUATION OF EPOXY PLASTICIZING IN CONTROLLING DEHYDROHALOGENATION (AS MEASURED BY ACID NO.) DURING STRIPPING OF POLYMER POLYOLS CONTAINING VINYLIDENE CHLORIDE

| Example III | 1A | 1B | 1C | 2A | 2B | 2C | 3A | 3B | 4A | 4B | 4C |
|---|---|---|---|---|---|---|---|---|---|---|---|
| Base Polyol: | 56 | → | → | 56 | → | → | 56 | → | 34 | → | → |
| A/S/VCl$_2$ Ratio | 40/40/20 | → | → | 40/40/20 | → | → | 40/40/20 | → | 70/10/20 | → | → |
| Polymer content in stripped product, wt% | 16.91 | → | → | 16.70 | → | → | 15.81 | → | 27.36 | → | → |
| Stripping (Batch) Temperature, °C.[1] | 120–125 | → | → | → | → | → | → | → | → | → | → |
| Flexor ® Plasticizer[2] | EPO | EP-8 | none | EPO | EP-8 | None | EPO | EP-8 | EPO | EPO | none |
| Amount of Plasticizer in gms per 100 gm of unstripped Polymer Polyol | 5.0 | 5.0 | none | 3.0 | 3.0 | none | 1.5 | 1.5 | 1.0 | 0.5 | none |
| Hydroxyl No., mgKOH/gm | — | — | — | — | — | | | | 26.85 | 25.22 | 24.63 |
| Acid No., mgKOH/gm | 0.043 | 0.054 | 0.18 | 0.052 | 0.065 | 0.14 | 0.04 | 0.047 | 0.125 | 0.133 | 0.26 |
| Remarks | Acceptable acid no. | Acceptable acid no. | control | Acceptable acid no. | Acceptable acid no. | control | Acceptable acid no. | Acceptable acid no. | Lower acid number (control) compared with control Still they are not acceptable | | |

Footnotes For Table III
[1] The product was sparged with nitrogen during stripping.
[2] Flexol ® Plasticizer EPO: Epoxidized Soybean Oil. Flexol Plasticizer EP-8: Octyl Epoxytallate. Plasticizer was mixed with unstripped polymer polyol before stripping.

TABLE IV

EVALUATION OF FLEXOL ® PLASTICIZER EPO. IN CONTROLLING DEHYDROHALOGENATION- DURING PREPARATION AND STRIPPING OF POLYMER/POLYOLS CONTAING VCl$_2$ SINGLE-STAGE RUNS MADE IN CONTINUOUS BENCH-SCALE UNIT[1], UTILIZING POLYOL 56 AND 2,2'-AZOBIS(ISOBUTYRONITRILE) CATALYST

| Example IV | 1 | 2 | 3 | 4 | 5 | 6 | 7 |
|---|---|---|---|---|---|---|---|
| Reaction Temperature, °C. | 120 | → | → | → | → | 130 | 110 |
| Residence Time, min. | 12 | → | → | → | → | → | → |
| Catalyst Conc., wt% in Total Feed | 0.375 | 0.184 | 0.55 | 0.55 | 0.55 | 0.55 | 0.55 |
| Monomer Content in Feed, wt% | 23.03 | 21.83 | 20.55 | 21.79 | 20.39 | 20.39 | 19.90 |
| Parts of Flexol ® Plasticizer EPO per 100 Parts of Polyol | 2.0 | 1.50 | 1.25 | 1.00 | 0.50 | 1.25 | 1.25 |
| Flexol ® Plasticizer EPO Conc., wt% in Total Feed | 1.5 | 1.15 | 1.0 | 0.77 | 0.39 | 1.00 | 1.00 |
| Acrylonitrile/Styrene/VCl$_2$ Ratio, wt% | 40/40/20 | → | → | → | → | → | → |
| Polyol + EPO + Catalyst Feed Rate, gm/hr | 2229 | 2223 | 2204 | 2168 | 2218 | 2214 | 2206 |
| Monomer Feed Rate, gm/hr | 667 | 615 | 570 | 604 | 568 | 567 | 548 |
| Product Weight, gm/hr | 2858 | 2817 | 2762 | 2768 | 2760 | 2751 | 2734 |
| Material Balance, % | 98.69 | 99.26 | 99.57 | 99.86 | 99.07 | 98.92 | 99.27 |
| Stripping (Batch) Temperature, °C.[2] | 120–125 | → | → | → | → | → | → |
| Residual Acrylonitrile in Unstripped Product, wt% | 2.60 | 3.07 | 1.75 | 2.25 | 2.04 | 2.07 | 2.70 |
| Residual Styrene in Unstripped Product, wt% | 1.10 | 1.59 | 0.87 | 0.96 | 0.97 | 0.99 | 1.45 |
| Residual Vinylidene Chloride in Unstripped Product, wt% | 2.30 | 2.61 | 1.79 | 2.29 | 1.95 | 2.10 | 2.42 |
| Residual TMSN[3] in Unstripped Product, wt% | 0.14 | 0.006 | — | 0.24 | 0.20 | — | Nil |
| Conversions, Acrylonitrile (A), % | 72.15 | 64.84 | 78.80 | 74.22 | 75.22 | 74.89 | 66.32 |
| Styrene (S), % | 88.21 | 81.79 | 89.46 | 89.00 | 88.22 | 87.99 | 81.92 |
| Vinylidene Chloride (VCl$_2$), % | 50.73 | 40.23 | 56.63 | 47.52 | 52.62 | 49.06 | 39.63 |
| Combined, % | 74.29 | 66.70 | 78.63 | 74.79 | 75.90 | 74.96 | 67.22 |
| Total Poly A in Stripped Product by Calc., wt% | 7.07 | 6.06 | 6.77 | 6.85 | 6.45 | 6.44 | 5.65 |
| Total Poly S in Stripped Product by Calc., wt% | 8.64 | 7.64 | 7.69 | 8.21 | 7.57 | 7.56 | 6.97 |
| Total Poly VCl$_2$ in Stripped Product by Calc., wt% | 2.48 | 1.88 | 2.43 | 2.19 | 2.26 | 2.11 | 1.69 |
| Total Polymer in Stripped Product by Calc., wt% | 18.19 | 15.58 | 16.89 | 17.25 | 16.28 | 16.11 | 14.31 |
| Poly A/Poly S/Poly VCl$_2$ Ratio in Stripped Product, wt% | 38.9/ 47.5/ 13.6 | 38.9/ 49/ 12.1 | 40.1/ 45.5/ 14.9 | 39.7/ 47.6/ 12.7 | 39.6/ 46.5/ 13.9 | 40/ 46.9/ 13.1 | 39.5/ 48.7/ 11.8 |
| Product Properties | | | | | | | |
| Brookfield Viscosity at 25° C., cps | 1000 | 800 | 980 | 1056 | 1064 | 1320 | 976 |
| Light Transmission, %[4] | 51.5 | 45.5 | 51.3 | 54.0 | 51.5 | 57.0 | 42.0 |
| Calculated Hydroxyl No., mg KOH/gm[5] | 45.03 | 46.80 | 45.97 | 45.92 | 46.68 | 46.41 | 47.40 |
| Acid No., mg KOH/gm | 0.03 | 0.02 | 0.047 | 0.044 | 0.05 | 0.040 | 0.042 |
| Filtration Hindrance | | | | | | | |
| 150 Mesh Screen, % Through | 100 | 100 | 100 | 100 | 100 | 100 | 100 |
| 150 Mesh Screen, Solids on Screen, ppm | 54 | 43 | 32 | 20 | 18 | 53 | 25 |
| 700 Mesh Screen, Time, Sec. | 500 | 230 | 305 | 820 | 300 | 385 | 293 |
| 700 Mesh Screen, % Through | 9.5[6] | 100 | 100 | 100 | 100 | 100 | 100 |
| 700 Mesh Screen, Solids on Screen, ppm | 566 | 34 | 14 | 52 | 18 | 22 | 30 |
| Centrifugible Solids, Stripped, wt% | 16.61 | 12.70 | 17.79 | 18.35 | 20.53 | 21.72 | 16.03 |

TABLE IV-continued

EVALUATION OF FLEXOL ® PLASTICIZER EPO. IN CONTROLLING DEHYDROHALOGENATION-DURING PREPARATION AND STRIPPING OF POLYMER/POLYOLS CONTAING $VCl_2$ SINGLE-STAGE RUNS MADE IN CONTINUOUS BENCH-SCALE UNIT[1], UTILIZING POLYOL 56 AND 2,2'-AZOBIS(ISOBUTYRONITRILE) CATALYST

| Example IV | 1 | 2 | 3 | 4 | 5 | 6 | 7 |
|---|---|---|---|---|---|---|---|
| Clear Layer Before Tipping, % | 4 | 4 | 5 | 4 | 4 | 5 | 6 |

Footnotes for Table IV

[1]First-stage reactor: CSTR of 550 cc volume; agitator speed: 800 rpm; start-up: using related polyol, EPO and catalyst blend and related monomer mix. Monomer concentration, which was lower than the desired level in the beginning, was gradually increased. Catalyst was completely dissolved in the related polyol and EPO blend by mixing at 40° C. for about 4 hours.

[2]The product was sparged with nitrogen during stripping.

[3]Tetramethylsuccinonitrile.

[4]500 millimicrons with 0.01% polymer in diluent.

[5]Calculation based on calculated total polymer content and hydroxyl number of base polyol.

[6]Suspecting polymer seeds formation during start-up.

TABLE V

PREPARATION OF HIGH-SOLIDS POLYMER/POLYOLS CONTAINING $VCl_2$ SINGLE-STAGE RUNS MADE IN CONTINUOUS BENCH-SCALE UNIT[(1)], UTILIZING POLYOL 34 AND 2,2'-AZOBIS(ISOBUTYRONITRILE) CATALYST

| Example V | 1 | 2 | 3 | 4 | 5 | 6* |
|---|---|---|---|---|---|---|
| Reaction Temperature, °C. | 120 | 120 | 115 | 110 | → | 120 |
| Residence Time, min. | 12 + 12 = 24 | 12 | → | → | → | 12 + 39 = 51 |
| Catalyst Conc., wt% in Total Feed | 0.47 | → | → | → | → | 0.40 |
| Monomer Content in Feed, wt% | 30.67 | 30.64 | 30.62 | 30.41 | → | 29.67 |
| Parts of Flexol ® Plasticizer EPO per 100 Parts of Polyol | 2.15 | 2.15 | → | → | → | — |
| Flexol ® Plasticizer EPO Conc., wt% Stripped Product Total Feed | 1.45 | 1.45 | | | | — |
| Acrylonitrile/Styrene/$VCl_2$ Ratio, wt% | 70/10/20 | → | → | → | → | 78/22/0 |
| Polyol + EPO + Catalyst Feed Rate, gm/hr | 1919 | 1906 | 1926 | 1922 | → | 1945 |
| Monomer Feed Rate, gm/hr | 849 | 842 | 850 | 840 | → | 821 |
| Product Weight, gm/hr | 2770 | 2752 | 2756 | 2733 | → | 2767 |
| Material Balance, % | 100.07 | 100.15 | 99.28 | 98.95 | → | 100.04 |
| Stripping (Batch) Temperature, °C.[(2)] | 125(160) | 120–125 | 120–125 | 120–125 | 95 | 120–125 |
| Residual Acrylonitrile in Unstripped Product, wt% | 2.61 | 3.89 | 4.47 | 4.47 | → | 1.38 |
| Residual Styrene in Unstripped Product, wt% | 0.07 | 0.15 | 0.19 | 0.17 | → | 0.143 |
| Residual Vinylidene Chloride in Unstripped Product, wt% | 1.92 | 2.34 | 2.74 | 2.50 | → | — |
| Residual TMSN[(3)] in Unstripped Product, wt% | — | — | 0.19 | 0.17 | → | 0.175 |
| Conversions, Acrylonitrile (A), % | 87.83 | 81.89 | 79.30 | 79.41 | → | 94.0 |
| Styrene (S), % | 97.70 | 95.10 | 93.83 | 94.46 | → | 97.8 |
| Vinylidene Chloride ($VCl_2$), % | 68.68 | 61.76 | 55.58 | 59.33 | → | — |
| Combined, % | 84.99 | 79.15 | 76.00 | 76.90 | → | 94.8 |
| Total Poly A in Stripped Product by Calc., wt% | 19.77 | 18.75 | 18.35 | 18.19 | → | 21.79 |
| Total Poly S in Stripped Product by Calc., wt% | 3.14 | 3.11 | 3.10 | 3.09 | → | 6.39 |
| Total Poly $VCl_2$ in Stripped Product by Calc., wt% | 4.42 | 4.04 | 3.68 | 3.88 | → | — |
| Total Polymer in Stripped Product by Calc., wt% | 27.33 | 25.90 | 25.13 | 25.16 | → | 28.18 |
| Poly A/Poly S/Poly $VCl_2$ Ratio in Stripped Product wt% | 72.3/11.5/16.2 | 72.4/12/15.6 | 73/12.3/14.7 | 72.3/12.3/15.4 | → | 77.3/22.7/ |
| Product Properties | | | | | | |
| Brookfield Viscosity at 25° C., cps | 2600 | 2336 | 2364 | 2260 | — | 2708 |
| Light Transmission, %[(4)] | 71.5 | 70.5 | 70.5 | 66.8 | — | 58.8 |
| Calculated Hydroxyl No., mg KOH/gm[(5)] | 26.14 | 26.51 | 26.80 | 26.79 | — | 26.07 |
| Acid No., mg KOH/gm | 0.058 | 0.058 | 0.059 | 0.059 | 0.064 | — |
| Filtration Hindrance | | | | | | |
| 150 Mesh Screen, % Through | 100 | 100 | 100 | 100 | — | 100 |
| 150 Mesh Screen, Solids on Screen, ppm | 60 | 63 | 23 | 14 | — | 14 |
| 700 Mesh Screen, Time, Sec. | 224 | 270 | 1200 | 320 | — | 243 |
| 700 Mesh Screen, % Through | 100 | 100 | 89.5[(6)] | 100 | — | 100 |
| 700 Mesh Screen, Solids on Screen, ppm | 74 | 7 | 21 | 14 | — | 34 |
| Centrifugible Solids, Stripped, wt% | 2.39 | 2.84 | 2.48 | 3.94 | — | 3.00 |
| Clear Layer Before Tipping, % | 2 | 2 | 2 | 4 | — | 1 |

Footnotes for Table V

[(1)]First-stage reactor: CSTR of 550 cc volume; agitator speed: 800 rpm; start-up using related polyol, EPO and catalyst blend and related monomer mix. Monomer concentration, which was lower than the desired level in the beginning, was gradually increased. Catalyst (VAZO-64) was completely dissolved in the related polyol and EPO blend by mixing at 40° C. for about 4 hours. Run No. 1 was made using two-stages. Second stage consisted of an unagitated column of 550 cc volume and having L/D ratio of 5:1.

[(2)]The product was sparged with nitrogen during stripping. In case of Run 1, the product was overheated to 160° C. for a short time during stripping. Temperature was lowered to 125° C. by lowering the heating mantle and applying forced air-cooling. Stripped product had slightly dark yellow color.

[(3)]Tetramethylsuccinonitrile.

[(4)]500 millimicrons with 0.01% polymer in triol diluent.

[(5)]Calculation based on calculated total polymer content and hydroxyl number of base polyol.

[(6)]Suspecting polymer seeds formation during start-up.

*Not within the scope of the present invention.

TABLE VI

PREPARATION OF POLYMER/POLYOLS CONTAINING VCl₂ USING NEW PROCESS TECHNOLOGIES SINGLE-STAGE RUNS (WITH TWELVE MINUTE RESIDENCE TIME) MADE IN CONTINUOUS BENCH-SCALE UNIT[1]

| Example VI | 1 | 2 | 3 | 4 |
|---|---|---|---|---|
| Polyvol/High Mol. Wt. Polyol (or Polymer/Polyol) Blend | Polyol 46/Polyol 27 | Polyol 56/Polyol 28 | Polyol 46/Polymer-Polyol S | → |
| Ratio of Polyol to High Mol. Wt. Polyol (or Polymer Polyol), wt% | 85/15 | 70/30 | 85/15 | → |
| Process Technology (2) | Polyol Blend | → | Polymer Polyol Addition | → |
| Reaction Temperature, °C. | 120 | → | → | → |
| Catalyst (3) Conc., wt% in Total Feed | 0.60 | 0.60 | 0.60 | 0.60 |
| Monomer Content in Feed, wt% | 23.33 | 33.06 | 22.54 | 23.49 |
| Parts of Plasticizer EPO per 100 Parts of Polyol | 1.25 | 1.50 | 1.25 | 1.25 |
| Plasticizer EPO Conc., wt% in Total Feed | 0.94 | 0.98 | 0.95 | 0.94 |
| Acrylonitrile/Styrene/VCl₂ Ratio, wt% | 40/40/20 | → | → | 25/55/20 |
| Polyol + EPO + Catalyst Feed Rate, gm/hr | 2136 | 1903 | 2141 | 2117 |
| Monomer Feed Rate, gm/hr | 650 | 940 | 623 | 650 |
| Product Weight, gm/hr | 2767 | 2828 | 2742 | 2746 |
| Material Balance, % | 99.32 | 99.47 | 99.20 | 99.24 |
| Stripping (Batch) Temperature, °C. (4) | 120-125 | → | → | → |
| Residual Acrylonitrile in Unstripped Product, wt% | 2.74 | 3.13 | 2.03 | 1.28 |
| Styrene in Unstripped Product, wt% | 1.18 | 1.18 | 0.93 | 2.20 |
| Vinylidene Chloride in Unstripped Product, wt% | 2.68 | 3.29 | 2.11 | 2.42 |
| TMSN (5) in Unstripped Product, wt% | — | — | 0.28 | 0.26 |
| Conversions, Acrylonitrile (A), % | 70.84 | 76.46 | 77.66 | 78.37 |
| Styrene (S), % | 87.44 | 91.12 | 89.77 | 83.10 |
| Vinylidene Chloride (VCl₂), % | 42.95 | 50.51 | 53.56 | 48.88 |
| Combined, % | 71.90 | 77.13 | 77.68 | 75.08 |
| Total New Poly A in Stripped Product by Calc., wt% | 7.07 | 10.94 | 7.37 | 4.89 |
| Total New Poly S in Stripped Product by Calc., wt% | 8.73 | 13.04 | 8.52 | 11.40 |
| Total New Poly VCl₂ in Stripped Product by Calc., wt% | 2.14 | 3.61 | 2.54 | 2.44 |
| Total New Polymer in Stripped Product by Calc., wt% | 17.94 | 27.59 | 18.43 | 18.73 |
| Total Polymer in Feed by Calc., wt% of Product | 0 | 0 | 2.68 | 2.67 |
| Total Polymer in Product by Calc., wt% | 17.94 | 27.59 | 21.11 | 21.40 |
| Product Properties | | | | |
| Brookfield Viscosity at 25° C. cps | 1480 | 2300 | 1620 | 1544 |
| Light Transmission, % (6) | 45.0 | 45.5 | 69.0 | 57.0 |
| Calculated Hydroxyl No., mgKOH/gm (7) | 35.50 | 34.79 | 34.43 | 34.30 |
| Measured Hydroxyl No., mgKOH/gm (8) | 37.24 | 36.61 | 36.68 | 36.57 |
| Acid Number, mgKOH/gm | 0.034 | 0.03 | 0.03 | 0.039 |
| Filtration Hindrance | | | | |
| 150 Mesh Screen, % Through | 100 | 100 | 100 | 100 |
| 150 Mesh Screen, Solids on Screen, ppm | 17 | 8 | 17 | 17 |
| 700 Mesh Screen, Time, Sec. | 302 | 288 | 403 | 317 |
| 700 Mesh Screen, % Through | 100 | 100 | 100 | 100 |
| 700 Mesh Screen, Solids on Screen, ppm | 7 | 12 | 47 | 14 |
| Centrifugible Solids, Stripped, wt% | 7.43 | 9.43 | 1.84 | 1.84 |
| Clear Layer Before Tipping, % | 2 | 3 | 0 | 0 |

Footnotes for Table VI (1) First-stage reactor: CSTR of 550 cc volume; agitator speed: 800 rpm; start-up: using related polyols, parent polymer polyol (only for Run No. 3), EPO and Catalyst blend and related monomer mix. Monomer concentration which was lower than the desired level in the beginning, was gradually increased. Catalyst (VAZO-64) was completely dissolved in the related polyols, parent polymer polyol (for Run 3 and 4) and EPO blend by mixing at 40° C. for about 4 hours.
(2) Polyol blend process involved use of a polyol blend containing a small amount of a high molecular weight polyol. Polymer/polyol process involved use of a blend containing a major amount of a polyol and a minor amount of a polymer/polyol.
(3) 2,2'-Azobis(isobutyronitrile) catalyst.
(4) The product was sparged with nitrogen during stripping.
(5) Tetramethylsuccinonitrile.
(6) 500 millimicrons with 0.01% polymer in triol diluent.
(7) Calculation based on calculated total polymer content and hydroxyl number of base polyol.
(8) Difference between calculated and measured hydroxyl number is not very significant.

POLYURETHANE PREPARATION

A free-rise foam was prepared utilizing the following procedure (parts are by weight): 100 parts of the polymer/polyol of Example II-4, 4.0 parts of water, 0.15 parts of Catalyst A-6, 1.0 part of Silicone L, 0.13 parts of stannous octoate, and 5.0 parts of T-101 were mixed in a baffled carton for 55 seconds. Isocyanate TDI (Index 105) was added to the mixture, and mixing was continued for 5 seconds. The foaming mixture was poured into a carton and allowed to rise freely. The resulting free-rise foam was oven-cured at 250° F. for 30 minutes. The cured foam had a density of 1.86 pcf, an air porosity of 62.7 ft³/min/ft², and a resiliency (% ball rebound) of 32. The Indentation Load Deflection (4-inch) was 72.0 lbs/50 in² (25% deflection) and 130.0 lbs/50 in² (65% deflection). The 25% Recovery Value was 54.9. The Support Ratio was 1.81. The Tensile Strength was 20.0%. The elongation was 127%. The Tear Resistance was 3.86 lbs/in. The 75% Compression Set was 16.0%. The 5-hour Humid Aging characteristics were 50% Compression Set—49.8%—and Load Loss—12.3%. The California Bulletin 117 char/afterflame values were 3.4/1.1.

Tables AI-AIII show properties of other foams of the present invention made by procedures similar to that described above. Foam evaluation results indicate that as little as one part (Example AI-1) of polyvinylidene chloride in tolylene diisocyanate-based high resilience foams eliminates the need for a flame retardant to pass the California Bulletin 117 or Federal Motor Vehicle Safety Standard (FMVSS) 302 tests.

TABLE AI
HR FOAMS PREPARED WITH POLYMER/POLYOLS CONTAINING ACRYLONITRILE (A) AND VINYLIDENE CHLORIDE (VCl$_2$)

|  | I-1 | I-2 | I-3 | I-5 | I-7+ | I-8+ | I-9+ |
|---|---|---|---|---|---|---|---|
| Polymer/Polyol from Example weight percent | 50 | → | → | → | → | → | → |
| Polyol 34, weight percent | 50 | → | → | → | → | → | → |
| Water | 2.7 |  |  |  |  |  |  |
| Diethanolamine | 0.8 |  |  |  |  |  | 51 |
| Catalyst A-1 | 0.1 |  |  |  |  |  | 2.86 |
| Catalyst 33 | 0.5 | → | → | → | → | → | 2.59 |
| Dibutyltin Dilaurate | 0.05 |  |  |  |  |  | 10.7 |
| Silicone L | 1.5 |  |  |  |  |  | 59 |
| Isocyanate TDI Index | 105 |  |  |  |  |  | 44.6 |
| Mold Exit Time, sec. | 35 | 47 | 64 | 66 | 46 | 53 | 111.0 |
| Density, lb/ft$^3$ Overall | 2.90 | 2.89 | 2.95 | 2.87 | 2.88 | 2.88 | 79.0 |
| Core | 2.71 | 2.69 | 2.62 | 2.55 | 2.58 | 2.59 | 2.49 |
| Porosity, ft$^3$/min/ft$^2$ | 7.3 | 8.5 | 10.9 | 7.4 | 5.4 | 7.8 |  |
| Resilience, % Rebound | 55 | 56 | 54 | 57 | 45.2 |  |  |
| ILD in$^2$ |  |  |  |  |  |  |  |
| 25% | 64.4 | 56.3 | 48.7 | 50.7 | 45.2 | 49.1 | 112.6 |
| 65% | 155.1 | 140.0 | 125.0 | 125.0 | 113.8 | 123.0 | 24.9 |
| Recovery, % | 76.5 | 76.5 | 79.4 | 77.0 | 78.3 | 78.4 |  |
| Support Factor | 2.41 | 2.49 | 2.57 | 2.47 | 2.71 | 2.51 | 230 |
| 25%(a) | 64.4 | 56.5 | 47.9 | 51.2 | 45.5 | 49.4 |  |
| 65%(a) | 155.1 | 140.5 | 122.9 | 126.3 | 114.6 | 123.9 | 2.85 |
| Tensile Strength, lb/in$^2$(*) | 30.5 | 30.0 | 25.8 | 28.6 | 30.3 | 29.1 | 10.2 |
| Elongation, %(*) | 190 | 206 | 185 | 240 | 256 | 235 |  |
| Tear Resistance, lb/in(*) | 2.95 | 3.84 | 2.81 | 3.47 | 3.28 | 2.83 | 20.0 |
| 75% Compression Set, %(*) | 10.0 | 10.2 | 9.2 | 9.8 | 10.6 | 10.7 |  |
| Humid Aged Comp. Set, 50%, % | 21.0 | 17.2 | 19.1 | 17.7 | 19.1 | 20.7 | 21.1 |
| Humid Aged Loss, 50%, % | 26.4 | 23.4 | 14.8 | 23.8 | 19.9 | 23.9 |  |
| Bulletin 117, char/afterflame | 1.1/1.0 | 1.9/0.0 | 2.0/0.0 | 2.0/0.0 | 2.0/0.0 | 0.9/0.0 | 1.0/0.0 |
| FMVSS 302 | 0.0 | 0.0 | 0.0 | 0.0 | 0.0 | 0.0 | 0.0 |

+within the scope of the present invention.
(a)Normalized to 2.90 lb/ft$^3$.
(*)Procedures: ASTM D1564-69.

TABLE AII
HR FOAMS PREPARED WITH POLYMER/POLYOLS CONTAINING ACRYLONITRILE, STYRENE, AND VINYLIDENE CHLORIDE

| Polymer/Polyol from Example | II-1 | II-2 | II-3 |
|---|---|---|---|
| weight percent | 50 | → | → |
| Polyol 34, weight percent | 50 | → | → |
| Water | 2.7 |  |  |
| Diethanolamine | 0.8 |  |  |
| Catalyst A-1 | 0.1 |  |  |
| Catalyst 33 | 0.5 | → | → |
| Dibutyltin Dilaurate | 0.05 |  |  |
| Silicone L | 1.5 |  |  |
| Isocyanate TDI Index | 105 |  |  |
| Exit Time, sec. | 41 | 35 | 34 |
| Density, lb/ft$^3$ Overall | 3.01 | 2.89 | 2.90 |
| Core | 2.69 | 2.53 | 2.57 |
| Porosity, ft$^3$/min/ft$^2$ | 11.6 | 12.7 | 9.1 |
| Resilience, % Rebound | 61 | 60 | 59 |
| ILD (lb/50 in$^2$)(*) |  |  |  |
| 25% | 49.0 | 43.5 | 43.3 |
| 65% | 126.0 | 108.5 | 110.0 |
| Recovery, % | 79.6 | 80.0 | 78.8 |
| Support Factor | 2.57 | 2.50 | 2.54 |
| 25%(a) | 47.2 | 43.7 | 43.3 |
| 65%(a) | 121.4 | 108.9 | 110.0 |
| Tensile Strength, lb/in$^2$(*) | 30.9 | 30.1 | 30.2 |
| Elongation, %(*) | 213 | 230 | 220 |
| Tear Resistance, lb/in(*) | 2.83 | 2.68 | 2.67 |
| 75% Compression Set, %(*) | 9.4 | 9.4 | 11.2 |
| Humid Aged Comp. Set, % | 21.9 | 20.1 | 23.1 |
| Humid Aged Load Loss, % | 18.1 | 15.0 | 17.1 |
| Bulletin 117, char/afterflame | 1.1/0.0 | 1.4/0.0 | 1.3/0.0 |
| FMVSS 302 | 0.0 | 0.0 | 0.0 |

(a)Normalized to 2.90 lb/ft$^3$
(*)Procedures: ASTM D1564-69

TABLE AIII
CONVENTIONAL NON-HR SLAB-STOCK FOAM HAVING POLYMER/POLYOL CONTAINING VINYLIDENE CHLORIDE

| Polymer/Polyol from Example | II-6 | II-7 | IV-1 |
|---|---|---|---|
| weight percent | 100 | → | → |
| Water | 3.5 |  |  |
| Catalyst A-6 | 0.13 |  |  |
| Silicone L | 1.0 |  |  |
| Stannous Octoate T-101 | 5.0 | → | → |
| Isocyanate TDI Index | 110 |  |  |
| Density | 1.70 | 1.70 | 1.71 |
| Porosity | 19.3 | 21.4 | 32.0 |
| Resilience | 32 | 34 | 32 |
| Indentation Load Deflection (*) |  |  |  |
| 25% | 52.9 | 50.0 | 57.3 |
| 65% | 96.5 | 91.2 | 105.0 |
| Recovery | 60.4 | 62.0 | 62.8 |
| Support Factor | 1.83 | 1.83 | 1.83 |
| Tensile Strength (*) | 21.4 | 19.4 | 18.6 |
| Elongation (*) | 169 | 140 | 109 |
| Tear Resistance (*) | 3.16 | 2.15 | 2.17 |
| Humid Aged Load Loss | 14.5 | 12.6 | 12.8 |
| Humid Aged Comp. Set, 50% | 24.2 | 17.9 | 16.9 |
| 75% Compression Set (*) | 11.0 | 9.6 | 9.5 |
| Bulletin 117, char/afterflame | 12 | 7.5/10.2 | 10.7/11.1 |

(*) Procedures: ASTM D1564-69

What is claimed is:

1. A continuous process for producing a polymer/polyol composition which comprises continuously polymerizing a reaction mixture formed by mixing a stream containing a polyol having a molecular weight of at least 1000 and a free radical catalyst, said stream being maintained at a temperature of 100° C. or higher, and a minor amount of a monomer stream consisting essentially of (a) from 45 to 5 weight percent of vinylidene chloride and (b) from 55 to 95 weight percent another ethylenically unsaturated monomer or monomers selected from the group consisting of acrylonitrile, methacrylonitrile, methyl methacrylate, styrene, and α-methylstyrene, of which at least 20 weight percent is acrylonitrile, and continuously stripping the desired product to remove unreacted monomers.

2. The continuous process of claim 1 in which the polyol has a molecular weight of at least about 3000.

3. A continuous process for producing a polymer/polyol composition which comprises continuously polymerizing a reaction mixture formed by mixing a stream containing a ethylene oxide capped polyether polyol having a molecular weight of at least 3000 and 2,2'-azobis(isobutyronitrile) catalyst, said stream being maintained at a temperature in the range of 105° C. to 135° C., and a minor amount of a monomer stream consisting essentially of a polymerizable mixture of acrylonitrile: styrene: vinylidene chloride in a weight ratio ranging from 90:0:10 to 50:20:30 and continuously stripping the desired product to remove unreacted monomers.

4. A process as in any one of claims 1, 2, and 3 in which an epoxy plasticizer is added to the unstripped product.

5. A process as in claim 4 in which epoxidized soybean oil is added to the polyol stream before polymerization.

6. A polymer/polyol composition produced by the process of claim 1.

7. A polymer/polyol composition produced by the process of claim 2.

8. A polymer/polyol composition produced by the process of claim 3.

9. A polymer/polyol composition produced by the process of claim 4.

10. A polymer/polyol composition produced by the process of claim 5.

* * * * *